(12) United States Patent
Miyauchi

(10) Patent No.: US 7,707,068 B2
(45) Date of Patent: Apr. 27, 2010

(54) METHOD AND DEVICE FOR CALCULATING TRUST VALUES ON PURCHASES

(75) Inventor: Koji Miyauchi, Kawasaki (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1552 days.

(21) Appl. No.: 10/976,280

(22) Filed: Oct. 29, 2004

(65) Prior Publication Data

US 2005/0096987 A1    May 5, 2005

(30) Foreign Application Priority Data

Oct. 29, 2003    (JP) ............................ P2003-368802

(51) Int. Cl.
  *G06Q 30/00* (2006.01)
  *G06F 17/30* (2006.01)
(52) U.S. Cl. ................................ 705/26; 705/1; 705/27
(58) Field of Classification Search ...................... 705/1, 705/26–27, 14.1, 14.4
  See application file for complete search history.

(56) References Cited

U.S. PATENT DOCUMENTS

| | | | | |
|---|---|---|---|---|
| 6,092,049 | A * | 7/2000 | Chislenko et al. ............. | 705/10 |
| 6,895,385 | B1 * | 5/2005 | Zacharia et al. ............... | 705/10 |
| 7,231,419 | B1 * | 6/2007 | Gheorghe et al. ........... | 709/203 |
| 2002/0133365 | A1* | 9/2002 | Grey et al. ...................... | 705/1 |
| 2004/0098287 | A1* | 5/2004 | Young et al. .................... | 705/5 |

FOREIGN PATENT DOCUMENTS

| | | |
|---|---|---|
| JP | 11-306185 | 11/1999 |
| JP | 2000-187666 | 7/2000 |
| JP | 2001-290843 | 10/2001 |
| JP | 2003-099652 | 4/2003 |
| JP | 2003-187176 | 7/2003 |
| JP | 2003-223449 | 8/2003 |

OTHER PUBLICATIONS

Definition of "weighted average" from InvestorWords.com.*
P2P-grid reference model based on trust value Author(s): Sun Zhi-xin; Yang Xi; Gong Jing Author Affiliation: Dept. of Comput., Nanjing Univ. of Posts & Telecommun., Nanjing, China Journal: Journal of Jilin University (Engineering and Technology Edition), vol. 38, No. 1, p. 127-30.*
First Pan-European Combined Consumer Portal and E-Commerce Site Chooses Autonomy. Business Wire, p. 0390, Sep. 1, 2000 Business Editors/High-Tech Writers Cambridge, England—(Business Wire)—Sep. 1, 2000.*
Arai et al., "Personalization Technology Allows Users Likes and Dislikes to be Discerned," *Nikkei Electronics* (ISSN: 0385-1680), Feb. 3, 2003, No. 840.

(Continued)

*Primary Examiner*—Jeffrey A. Smith
*Assistant Examiner*—William J. Allen

(57) ABSTRACT

Trust values of n nodes are calculated by relating nodes having corresponding relations with arrows. Pij (i, j=1 to n) is assigned as a weight for an arrow from node ui to node uj on the basis of the relation between the nodes. P'=CPcP+(1−Cc)E is calculated, where Cc=constant, E=a predetermined matrix, pP=a matrix having elements at row i and column j represented by Pij. The trust value of each node is calculated on the basis of P'.

12 Claims, 7 Drawing Sheets

OTHER PUBLICATIONS

Page et al., "The PageRank Citation Ranking: Bringing Order to the Web" (http://www-db.stanford.edu:8090/pub/199-31). Stanford Technical Report.Stanford University, 1999.

Haveliwala, Taher, "Efficient Computation of Page Rank" (http://dbpubs.stanford.edu:8090/pub/1999-31). *Stanford Technical Report.Stanford University,* 1999.

Kamvar et al., "Extrapolation methods for accelerating PageRank computations," *Proceedings of the Twelfth International Word Wide Web conference,* 2003.

Kamvar et al., "Adaptive Methods for Computation of PageRank" (http://dbpubs.stanford.edu.8090/pub/2003-26). *Stanford Technical Report.Stanfor University,* 2003.

Brin, S. and Page, L., "The Anatomy of a Large Scale Hypertextual Web Search Engine," Proc. of the seventh International Web Conference, 1998.

Kamvar, et al., "Exploiting the Block Structure of the Web for Computing PageRank," Stanford University Technical Report, 2003.

Miyauchi, K., "An Application of Trust Randking in Online Community to protection fo Private Data," Hewlett-Packard Laboratories Japan. Feb. 18, 2007.

"Nikkei Electronics Technical Section 2003", 2003.

\* cited by examiner

US 7,707,068 B2

METHOD AND DEVICE FOR CALCULATING TRUST VALUES ON PURCHASES

RELATED APPLICATIONS

The present application is based on, and claims priority from, Japanese Application Number 2003-368802, filed Oct. 29, 2003, the disclosure of which is hereby incorporated by reference herein in its entirety.

FIELD OF INVENTION

The present invention relates to a trust value calculating method and device for defining trust values of various elements concerned with consumption activities of daily life and for defining trust values among the elements and for enabling consumers, etc. to make their best choices on the basis of the trust values.

BACKGROUND OF INVENTION

Various elements, such as the motive of consumers, advertising media, shops, manufacturers, experts (critics), etc. are involved with one another in human daily consumption activities. In this document, these factors concerned with consumption activities are referred to as "subjects." These subjects have various relations with one another. It is assumed there is some kind of trust relation among these subjects. Consumers can obtain various information indicating the relations among these subjects. A commercial article A is made by a manufacturer B, and sold at a shop C. In a mode of the prior art, manufacturer B advertises the commercial article A by using the Internet, and shop C advertises the commercial article A by utilizing inserts in local newspapers.

Furthermore, a critic D analyzes commercial article A and places the analysis in magazine E. The same consumption activities are carried out on other goods, and considerable information about the article, manufacturer, shop, expert and the magazine is available. Consumers frequently cannot judge which manufacturer, shop, expert or the like can be trusted. In order to solve the above problem, the prior art has provided an indicator or information about credibility of manufacturers, shops, experts, etc.

It is more advantageous to obtain information about the trust values relevant to "subjects" in the consumption activities, and information about personal taste of the above information. It is known to use individual personal taste information about the to obtain the most credible information about consumption activities.

Prior art disclosing the foregoing include:

(1) Laid-open JP Patent Publication (P1999-306185)

(2) Lawrence Page; Sergey Brin; Rajeev Motwani; Terry Winograd. The PageRank Citation Ranking: Bringing Order to the Web. Technical Report. Stanford University, 1998.

(3) Noriko Arai; Kazuhiro Kitagawa. Personalization technique. Nikkei Electronics, 2003-02-03.

In JP P-1999-306185, PageRank is expanded so that texts and multimedia data and information of persons accessing these data are installed in a link structure as virtual web pages. In addition the web pages have ranking of information. When a user accesses various multimedia data on the Internet to download the data or register the data as bookmarks, the link structure of the web pages is expanded and the degree of importance is calculated. In the PageRank method disclosed in the Page et al document, web pages on the Internet are defined as nodes, and the trust values thereof and the estimating method thereof are described. However, the PageRank method targets only the importance degree of the web pages on the Internet. Accordingly, there is no reflection of information concerning subjects which are not described on the Internet. Thus the Page Rank method does not always provide consumers with the best information.

The Arai document introduces a personalization technique relying on user likes and dislikes. According to this technique, goods are recommended or introduced on the basis of the taste information of individuals. Arai et al includes a profile matching system, a rule base system, and a collaborative filtering system. According to these systems, goods which seem to be best for individuals are recommended on the basis of information such as individuals' taste information, purchase records, purchase patterns of general consumers, etc. However, in these methods, no consideration is paid to information about the trust values of subjects in consumption activities. Accordingly, an uncertain element as to whether it is truly good to purchase a recommended commercial article or the like may remain regarding the recommended commercial article or the like.

SUMMARY OF THE INVENTION

An object of the present invention is to provide a new and improved method of and apparatus for defining the relations among various subjects concerned with consumption activities, calculating trust values of these subjects and providing information which consumers can use in consumption activities with high reliability.

Another object of the present invention is to provide a new and improved method of and apparatus for providing information about subjects which are coincident with tastes of individuals and credibly reflect taste information of the individuals concerned.

According to one aspect of the present invention, trust values are calculated without limiting the information to information on the Internet and by expanding the trust value information to various relations among subjects in consumption activities. In the PageRank method, the trust values of all the links are considered to be equivalent to one another. In contrast according to an aspect of the present invention there are definitions of the trust values of links, the type of the trust relation, and the trust value of each subject. The trust values are calculated by considering these matters.

The present invention differs from the disclosure of JP 1999-306185 by providing trust values of information relevant to the web, and trust values of subjects having no direct relation with the information relation to the web and trust values of relations among these subjects. Further weighting is carried out on the basis of the type of relations.

According to a further aspect of this invention, credibility indicators for manufacturers, shops, experts, etc. are determined by calculating trust values in the field of consumption activities. By referring to these credibility indicators, a customer can select a shop or manufacturer or a shop or a manufacturer can select media to place advertisements.

The trust values can be presented by responding to information on the Internet, and trust information from various data sources such as advertisements, questionnaires, articles on magazines, etc. The trust values can be calculated by responding to the kind of trust relation or information about the subjects for which the trust degree is known in advance.

The trust values can also be calculated by responding to the degree of trust to various subjects which are owned by individuals. So-called personalization based individualization can be performed. The trust value calculation can be performed by using an overall trust network graph created by collecting information and by using a partial trust network graph concerning a partial subject group of subscribers of some specific magazine or the like.

According to an additional aspect of the invention, goods which sell well are estimated highly, and manufacturers, shops, experts, etc. which are trusted by trusted manufacturers, shops, experts, and other subjects are estimated highly, so that a more accurate estimate can be supplied to customers. Furthermore, since the trust relation in the general consumption activities is modeled, the field of goods is not limited to a specific field, and is broadly applicable.

The above and still further objects, features and advantages of the present invention will become apparent upon consideration of the following detailed description of the specific embodiments thereof, especially when taken in connection with the accompanying drawings.

DETAILED DESCRIPTION OF THE DRAWING

Figure 7:
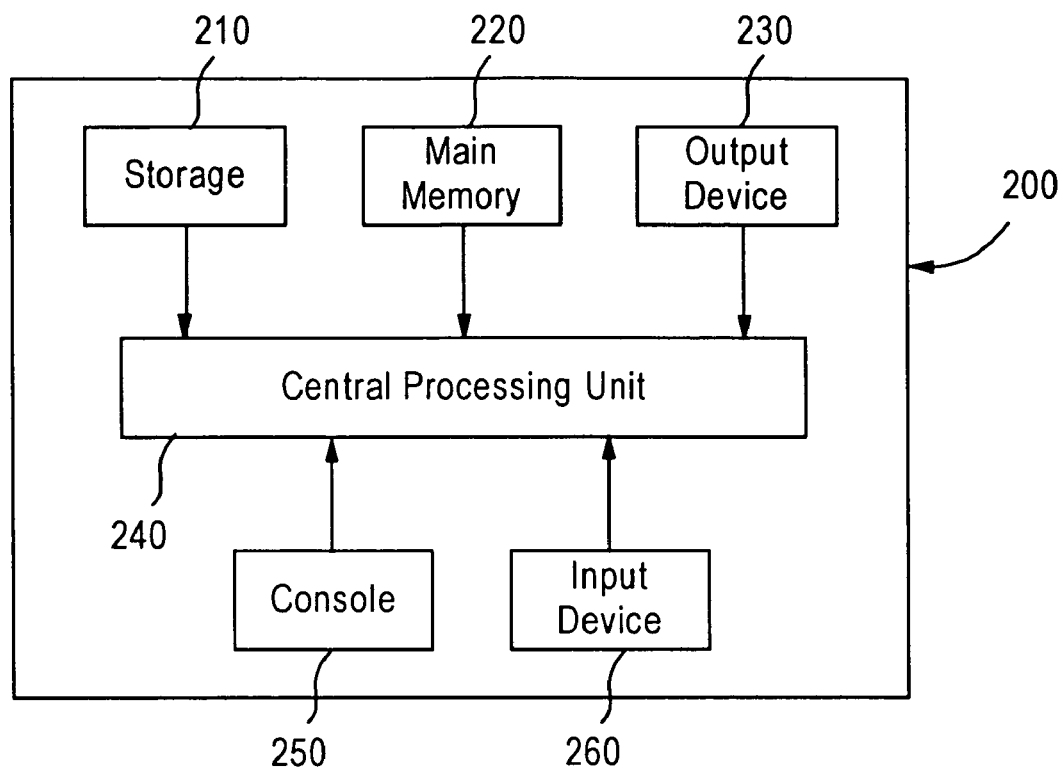
FIG. 7 is a block diagram of a preferred embodiment of a device for performing the present invention.

FIG. 7 is a block diagram including a housing 200 containing a storage device 210, a main memory 220, an output device 230, a central processing unit (CPU) 240, a console 250 and an input device 260. The central processing unit (CPU) 240 reads a control program from the main memory 220, carries out information processing by responding to (1) commands from the console 250, user information from the input device 260 and (3) trust data information stored in the storage device 210. CPU 240 outputs information about the subjects with high reliability to the output device 230.

Web sites, consumers, advertisement media, shops, manufacturers, experts (critics), etc. ("subjects") are concerned with the consumption activities of daily life. Estimates are made of the trust relations that exist among these subjects.

Figure 1:
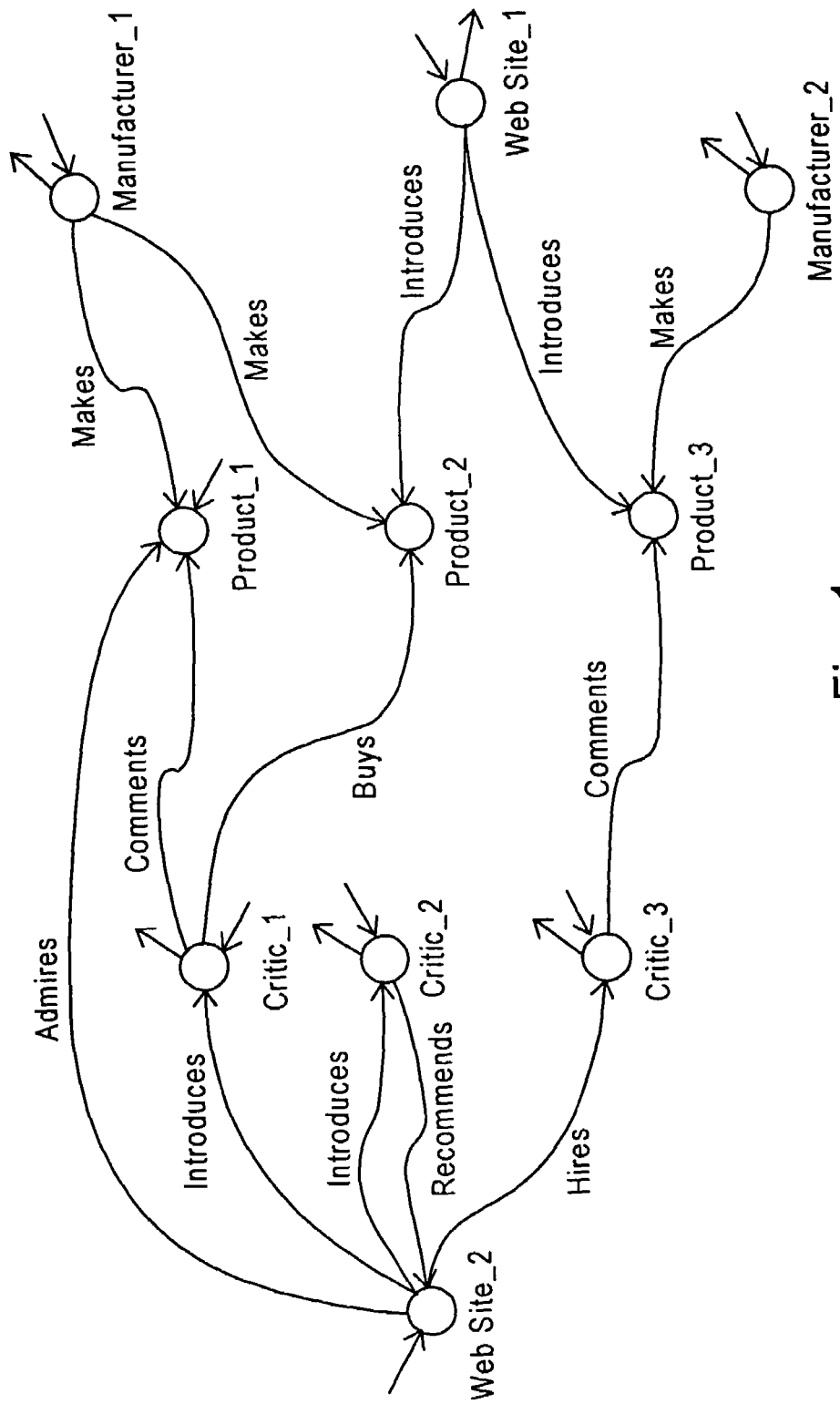
FIG. 1 is a diagram including the concept of a trust network graph.

FIG. 1 is a network diagram of consumption activities including "subjects" in the form of Internet sites, critics, goods, selling offices, manufacturers of goods, etc. All subjects in the consumption activities of FIG. 1 are selected as nodes. Furthermore, these subjects are connected to one another by arrows, and the trust relations among the subjects and the trust values thereof are defined.

The subjects in the consumption activities and the trust relations among the subjects are extracted from various information sources, such as questionnaires, web pages, magazines, electrical message boards, etc. The subjects are represented by using a network diagram in which the subjects are represented as nodes and the trust relations are represented as arrows. FIG. 1 is referred to as a "trust network graph without trust values". The trust degree of nodes and arrows are calculated to determine trust values. The calculation is carried out by weighting the type of trust relations and, the trust degree of the nodes. Subsequently, the trust values thus calculated are filled in the trust network graph. This is referred to as "trust network graph with trust values". On the basis of this information, information for recommending/introducing goods is supplied to consumers and effective marketing information is supplied to sellers. The trust network graph is not limited to the consumption activities, and can be applied to subjects in various communities and the relations among them.

FIG. 1 is a trust network graph helpful in describing how the apparatus of FIG. 7 determines credibility indicators and trust values. "Subjects" such as web sites, consumers, advertisement media, shops, manufacturers, experts (critics), etc. which participate in the consumption activities are represented as nodes, and the trust relations among the subjects are represented as arrows. The pointing direction of an arrow is from a trusting node to a trusted node. A diagram of the trust relations in the field of consumption activities is called a "trust network graph". In FIG. 1, no trust value has yet been calculated: hence, FIG. 1 is referred to as a "trust network graph without trust values".

According to one aspect of the invention, "subjects" for which trust values are needed are first determined, and then "arrows" relating the subjects with one another are determined. The apparatus of FIG. 7 determines values associated with these "subjects", "arrows" and weights therefor are determined.

The following concepts are, for them, considered as the basis of the trust relations existing in the targeted consumption activities.

(1) A customer desiring to purchase quality goods of credible manufacturers or shops.

(2) A customer consults experts or magazines which the customer trusts.

(3) A customer consults another customer who has actually used the goods.

(4) A manufacturer or shop places an advertisement in a credible advertisement medium.

(5) A critic that rates quality goods, shops, and manufacturers.

Nodes having the terminal points of arrows extending from many nodes are in the nodes of the network diagram. Such nodes can be considered as nodes which have achieved much trust in the consumption activities. Nodes having terminal points of arrows extending from credible nodes are also considered as nodes having high trust.

It is expected that a general customer takes an action on the faith of credible nodes as described above, for example, experts or advertisement media of magazines, etc. If the information about trust relations is used, the consumption activities of customers can be predicted on the basis of the information or it is used as a hint for selling activities.

To detect a node having high trustworthiness, a trust value indicating which node has a higher trustworthiness than the other nodes in the trust network graph is calculated by the processor of FIG. 7. The trust value is calculated in accordance with the trust relation or the type of the relation, or so that nodes which are found to be credible in advance are heavily weighted and nodes which are found not to be credible in advance are lightly weighted. The trust value thus calculated is allocated to the node to construct a trust network graph with trust values.

The processor of FIG. 7 constructs a trust network graph on the basis of the above concepts in the following steps (FIG. 2):
10: select nodes/arrows;
20: create a trust network graph without trust values;
30: determine weights of nodes/arrows;
40: calculate the trust values of nodes; and
50: create a trust network graph with trust values.

Figure 2:
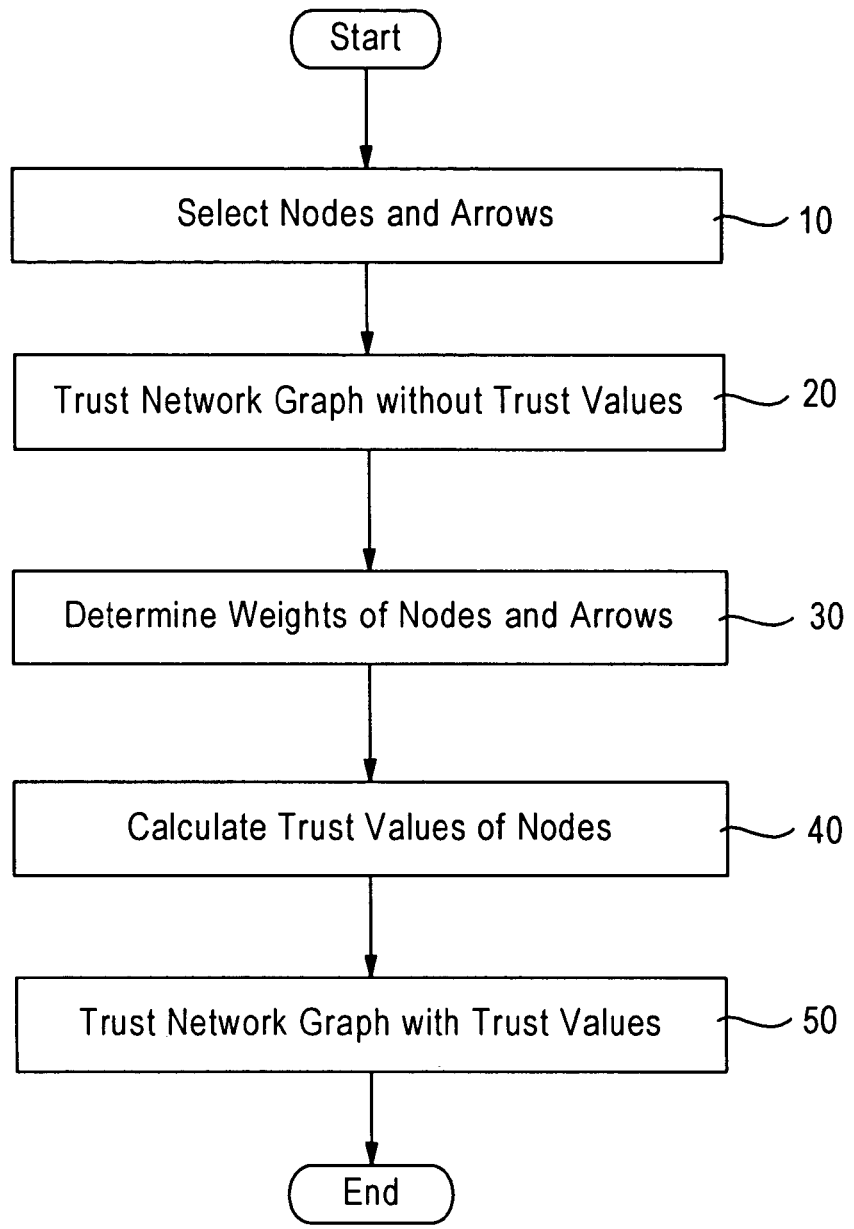
FIG. 2 is a general flowchart of operations performed by the apparatus of FIG. 7.

The algorithm shown in FIG. 2 and performed by the processor if in FIG. 7 is now described in detail.

Step 10: Select Nodes/Arrows

The "subjects" concerned with the trust network in the consumption activities are customers, experts (critics), advertisement media, magazines, web sites, goods, manufacturers, retailers, etc. These "subjects" are represented as nodes. The subjects (nodes) having an established trust relation are connected to one another with arrows. An arrow extends from a trusting node to a trusted node. The trust relations among the nodes are "evaluates a product", "describes an article of a magazine", "places an advertisement", "buys a product", "makes a product", "introduces a product", "hires an expert", etc.

Step 20: Create Trust Network Graph Without Trust Values

In step 10, the processor of FIG. 7 creates a trust network graph created on the basis of the determined information (see FIG. 1).

Step 30: Determine Weights of Nodes/Arrows

Next, the processor of FIG. 7 collects relevant data are collected from information sources concerned with consumption activities to obtain trust values for the nodes. For example, a page for a target product is accessed from http://www.about.com to refer to a relevant web page. Introductions about the product or evaluation articles on magazines, advertisements, questionnaire results, etc. are available as data to obtain trust values. This information can be manually obtained, or automatically or semi-automatically extracted by using an information extracting machine to which natural language processing is applied or the like.

When there is information concerning some trust relations among nodes, the processor of FIG. 7 weights the arrows on the basis of the information. Furthermore, when credible nodes are known in advance on the basis of the information, higher weights are allocated to those nodes.

Step 40: Calculate Trust Values of Nodes

The processor of FIG. 7 maps trust values of the respective, nodes on the basis of the weights determined in step 30. The calculation method is described later.

If the trust value of the node is high, the trust value node has higher reliability.

Step 50: Create Trust Network Graph With Trust Values

The processor of FIG. 7 maps values calculated in step 40 in the trust network graph, whereby the information about high reliability subjects (nodes) can be grasped at a glace.

Figure 3:
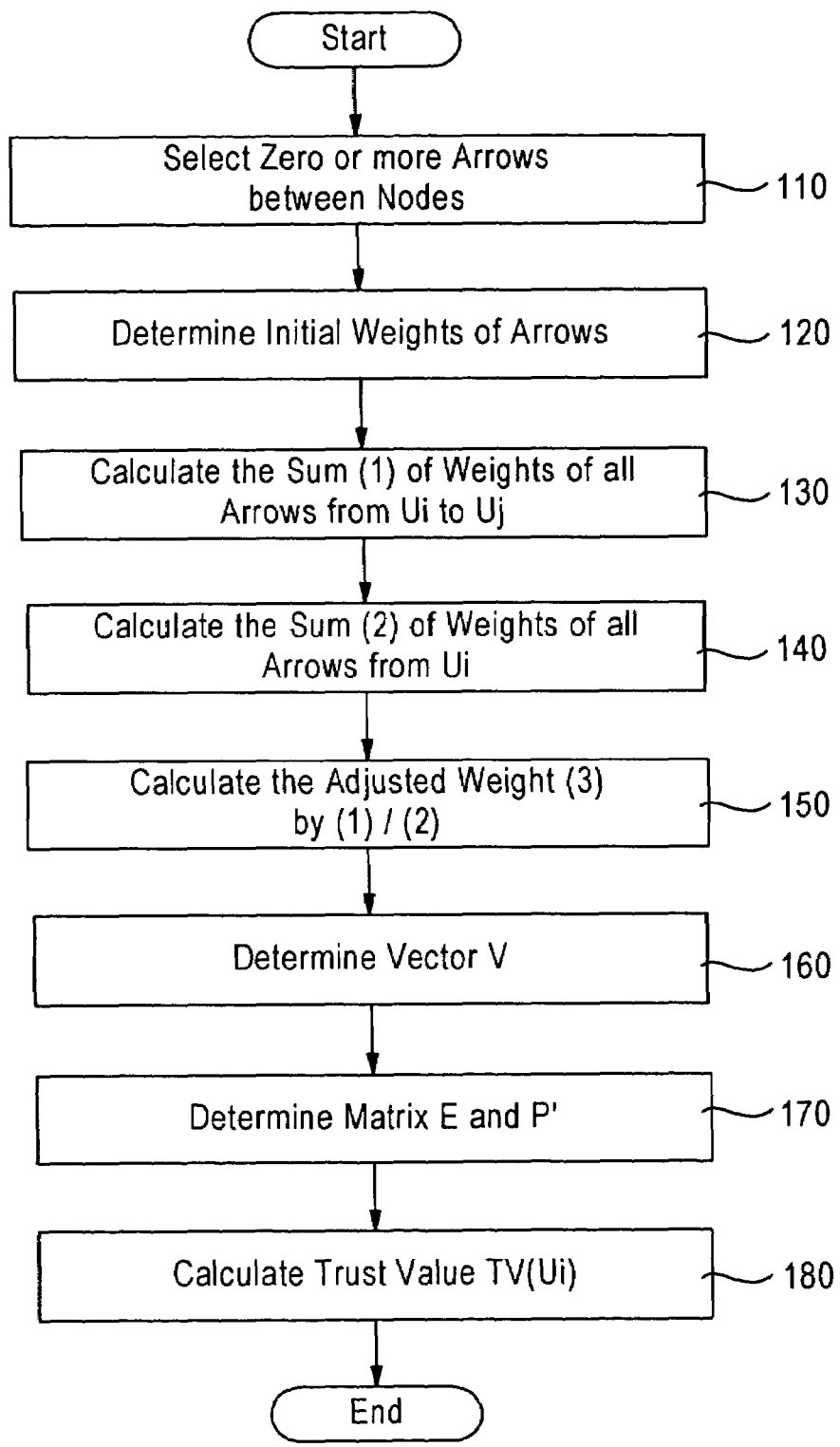
FIG. 3 is a flowchart of an algorithm that the apparatus of FIG. 7 performs for calculating trust values.

The trust value calculation method is described with reference to FIG. 3 that includes the following steps:
110: select zero or more arrows among nodes;
120: determine initial weights of all arrows;
130: calculate the sum of the initial weights of all arrows directed from a node ui to a node uj;
140: calculate the sum of the initial weights of arrows starting from node ui;
150: calculate adjusted weight $Pij=AW_{adj}(ui \rightarrow uj)$;
160: define vector v;
170: calculate matrix $E=e \cdot v^T$, and calculate $P'=cP+(1-c)E$; and
180: calculate trust value TV(ui) of node ui.

The calculation of the trust values is described hereunder in detail.

Step 110: Select Zero or More Arrows Among Nodes

Arrows connecting nodes are now described. If no information on reliability exists between nodes, no arrow exists. Furthermore, the number of arrows between nodes is not limited to one. Consider the example of a critic A writing an article about the function and price of the commercial article B that appears in magazine C at around the same time an article concerning the performance of the commercial article B by the critic A appears in a magazine C'. In such an example, two arrows exist between the node representing the critic A and the node representing the commercial article B. The arrows between the nodes are determined by the above information. In this example, an arrow extends from the node ui to the node uj and is represented by $A(ui \rightarrow uj)k$ (k=1 to m).

Step 120: Determine Initial Weights for All Arrows

In accordance with the content of information existing between nodes, initial weights of arrows $A(ui \rightarrow uj)k$ (k=1 to m) are determined.

Step 130: Calculate the Sum of Initial Values of All Arrows Extending From Node ui to Node uj When the sum of the initial values of the arrows from the node ui to node uj is represented by $AWacc(ui \rightarrow uj)$,

[Equation 7] (1)

$$AWacc(ui \rightarrow uj) = \sum_{k=1}^{m} AW_{init}(ui \rightarrow uj)k$$

Step 140: Calculate the Sum of Initial Weights of Arrows Having Node ui as a Starting Point The sum of the initial values is represented by AWacc (ui).

Step 150: Calculate Adjusted Weight Pij as:

(2) $Pij=AWacc(ui \rightarrow uj)/AWacc(ui)$ [Equation 8]

By this adjustment, the weight of the arrow between the respective nodes takes a value from 0 to 1, and is represented by Pij.

Step 160: Define Vector v

The vector v is a vector including one or more elements, each of which represents a weight for a node and the sum of the respective elements is 1. The processor pf of FIG. 7 adjusts the value of the vector v is considered as the degree of trust of the node, and is determined on the basis of evaluations of articles in magazines, trust of individuals, ranking information of evaluating agencies, etc. to the node. The value of the vector v is adjusted according to a desired object of a consumer to thereby obtain trust based on the object of the consumer.

Step 170: Calculate Matrix $E=e \cdot v^T$, and Calculate $P'=cP+(1-c)E$

The processor of FIG. 7 calculates matrix $E=e \cdot v^T$ by using a vector e in which all the elements are "1", and $P'=cP+(1-c)E$ is calculated. Here, c represents a constant having a value $0 \leq c \leq 1$, the value of C c is determined experimentally.

Step 180: Calculate Trust Value TV(ui) of Node ui

The trust value TV(ui) of the node ui is defined as follows:

[Equation 9] (3)

$$TV(ui) = \sum_{uj \in BN(ui)} P'(uj \rightarrow ui) TV(uj)$$

where:

(4) $U_j \in BN(U_i)$ [Equation 10]

represents a set of nodes that direct arrows to noce node ui. The processor of FIG. 7 calculates an eigen vector (TV(ui), i=1 to n) of Expression (3) (i.e., Equation 109) is calculated. By defining vector $X^T=(TV(u1), \ldots, TV(un))$ is in Expression (3) can be represented as follows:

(5) $\vec{X} = P'^T \vec{X}^T$ [Equation 11]

The processor of FIG. 7 calculates the vector $\vec{X}$ is calculated as an eigen vector to an eigen value "1" of the transposed matrix of the matrix P'. Each value of the eigen vector $\vec{X}$ corresponds to the trust value of each node. In these nodes, a node uj having a large value of TV (uj) is considered to be a node (subject) having high trust.

This embodiment is applied to the following assumed consumption activities by using the above calculation results.

(a) One manufacturer is more credible than other manufacturers and products made by the credible manufacturer are introduced or recommended.

(b) Consumers can buy products made by the most credible manufactures at most credible shops.

However, since the products do not necessarily serve as subjects, the above example is rewritten so that there are indirect trust relations through the products. For example, in case that an expert recommends a product, the expert is considered to trust the manufacturer who made the product.

Figure 4:
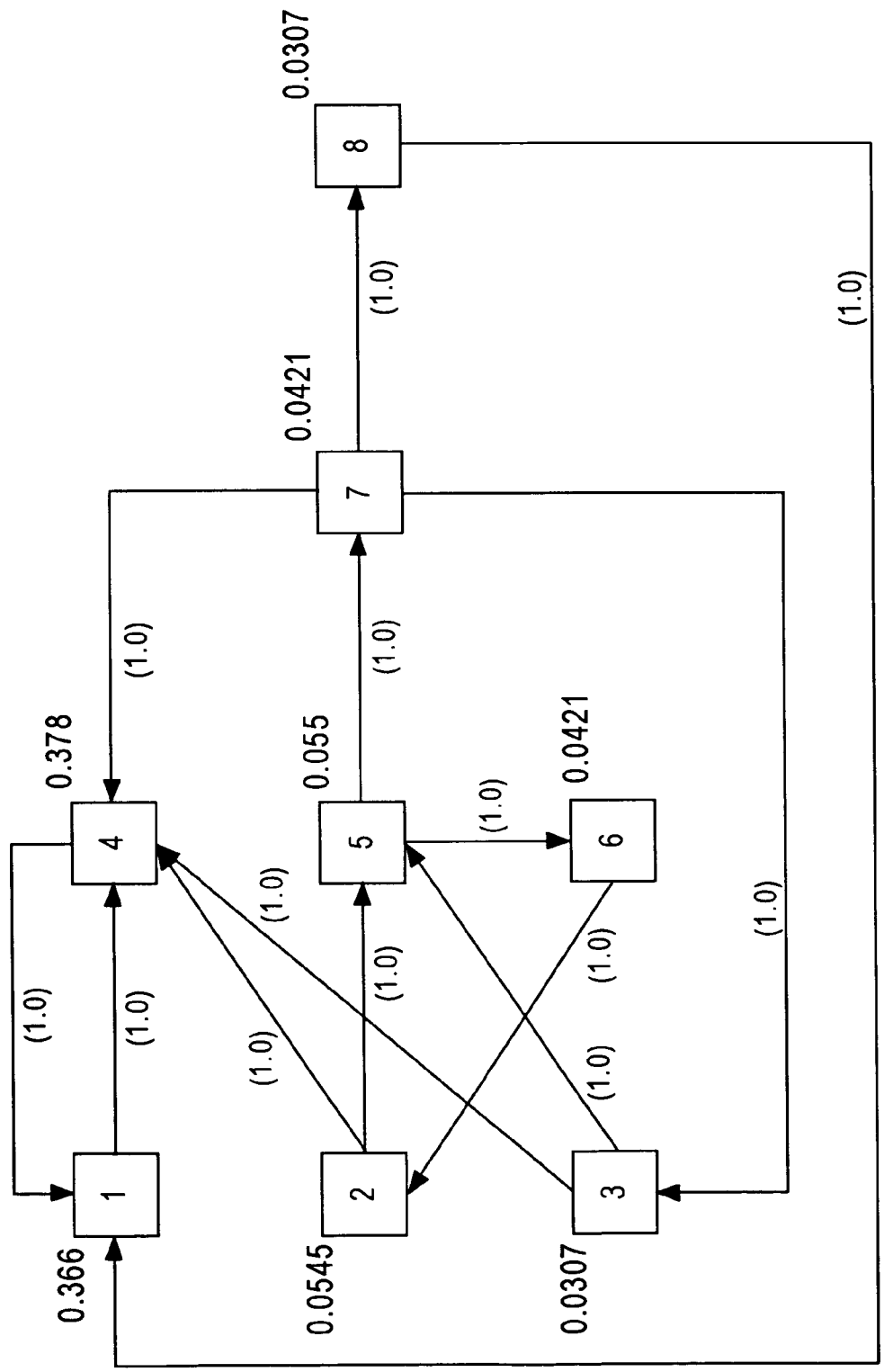
FIG. 4 is a diagram of a first example of operations that the apparatus of FIG. 7 performs, wherein numeric values are filled in the trust network graph.

Next, consider an example in which the above calculation result is mapped in the trust network graph. FIG. 4 is an example in which nodes and the trust values of the nodes are selected, and arrows are filled among the nodes. In FIG. 4, a numbered box represents anode, and an included numeric value allocated to each node represents the calculated trust value of the node. The processor of FIG. 7 performs the calculation under the condition that c=0.85 and the value of the vector V is equal to "1/n" for all the nodes. The numeric values in parentheses represent weights of arrows. In FIG. 4, "1.0" is used as the weight of each arrow.

Figure 5:
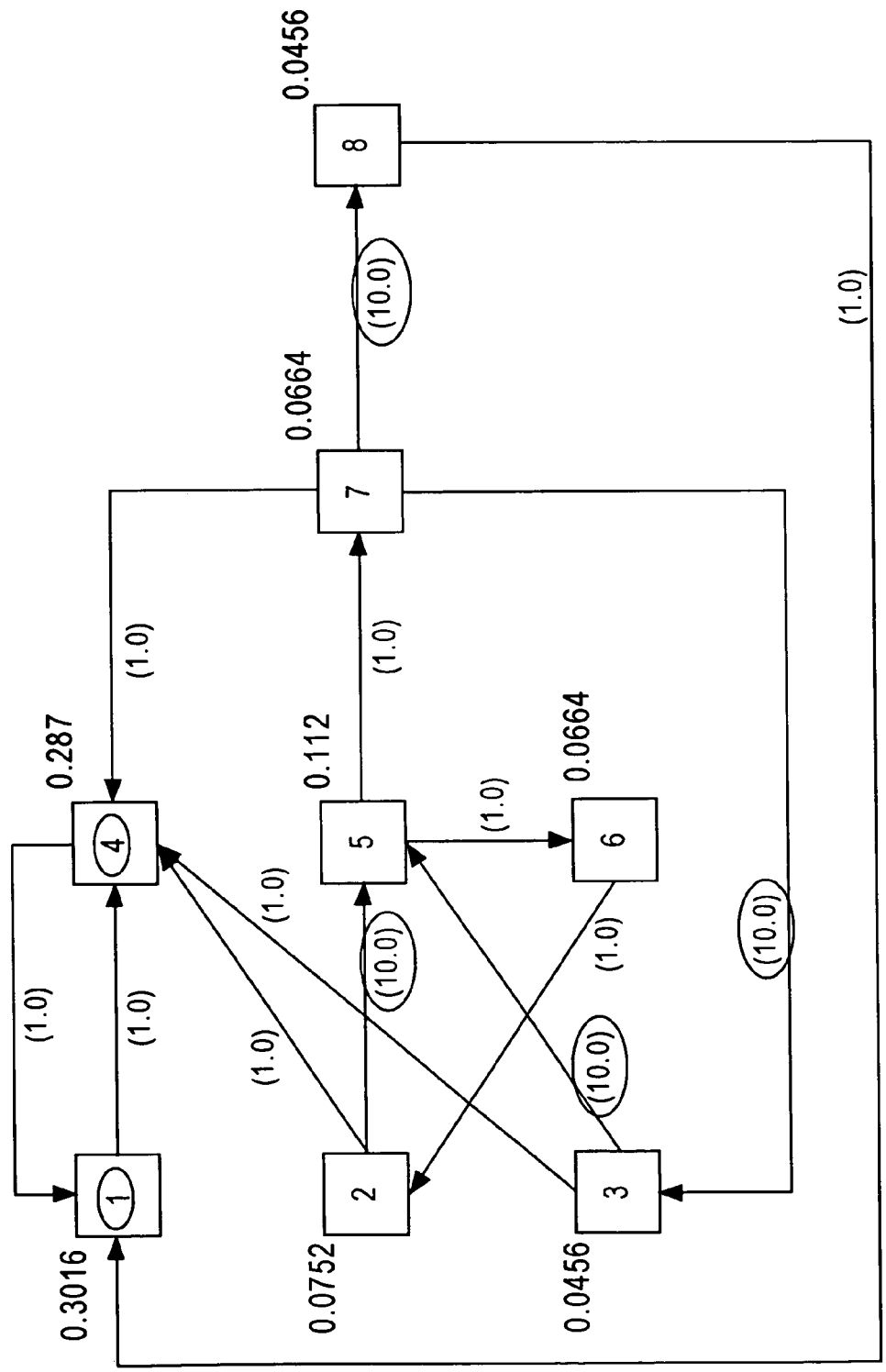
FIG. 5 is a diagram showing a second example of operations that the apparatus of FIG. 7 performs, wherein numeric values are filled in the trust network graph.

In FIG. 5, "10.0" is used as the weights of arrows for the specific arrows (node 2→node 5, node 3→node 5, node 7→node 3, node 7→node 8). The processor of FIG. 7 calculates the trust values of the respective nodes when the above value is used and the other conditions that are not changed are shown. The processor changes the trust value of each node by the weights of the arrows.

Figure 6:
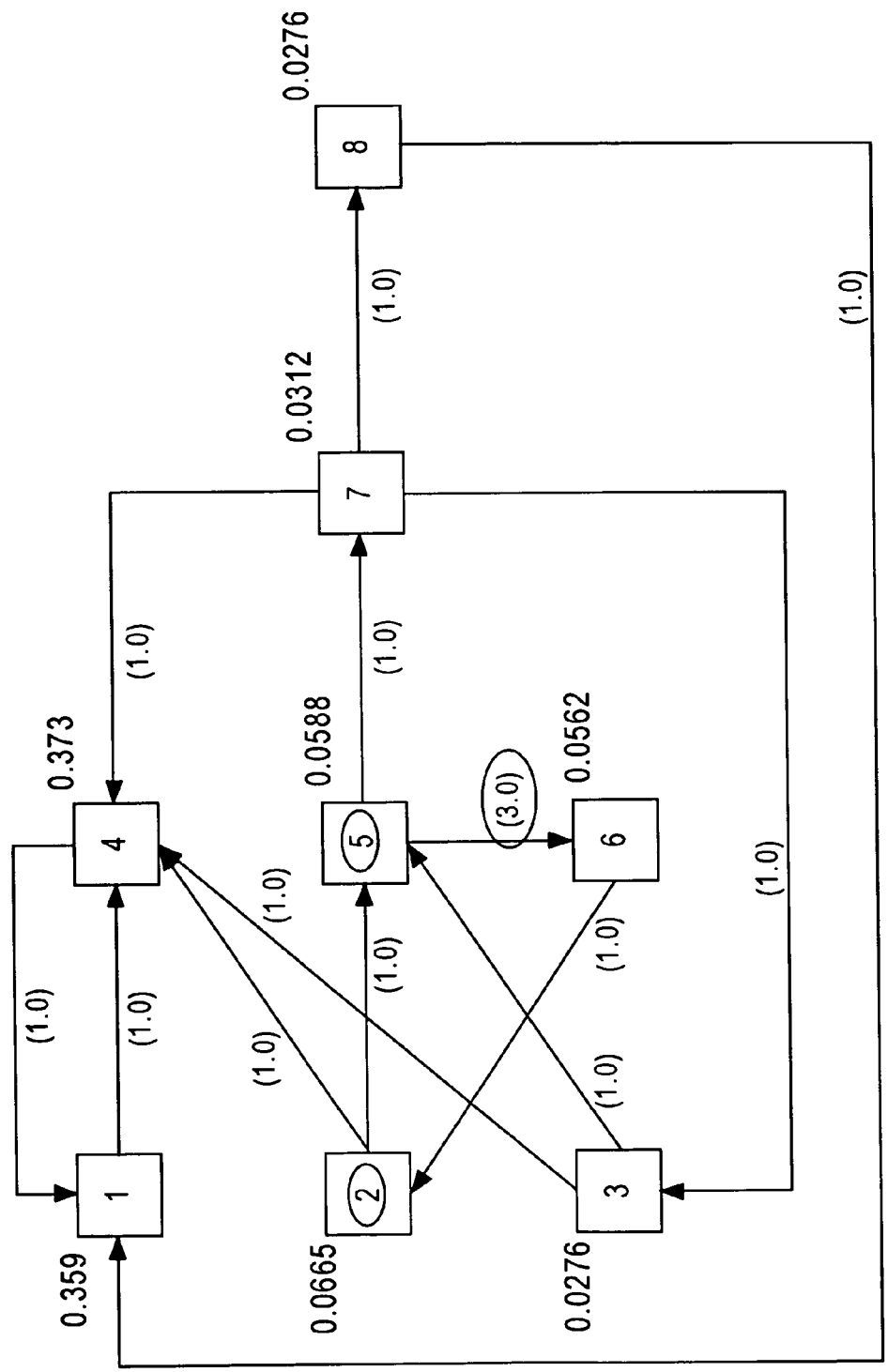
FIG. 6 is a diagram showing a third example of operations that the apparatus of FIG. 7 performs, wherein numeric values are filled in the trust network graph.

The processor changes the value of the node 1 in FIG. 5 from 0.366 in FIG. 4 to 0.3016, and the value of the node 4 in FIG. 5 from 0.378 in FIG. 4 to 0.287. In FIG. 5 the node 1 has a higher trust value than the node 4 whereas in FIG. 4 the node 4 has a higher trust value than the node 1. FIG. 6 shows the trust values of the respective nodes that the processor calculates on the condition that "3.0" is selected as the trust value of a specific arrow (node 5→node 6) and the other conditions are unchanged. The value of the node 2 in FIG. 6 is changed from 0.0545 in FIG. 4 to 0.0665, and the value of the node 5 in FIG. 6 is changed from 0.055 in FIG. 4 to 0.0588. Although the node 5 has a higher trust value in FIG. 4, the trust value of the node 2 has a higher trust value in FIG. 6.

By changing weights of nodes or arrows in consideration of taste profile information of individuals, trust values the processor calculates with consideration of the taste profiles of the individuals are obtained. For example, there is described a case where the trend of the taste of some individual is similar to the content of some fashion magazine A. The vector v defined in step 160 of FIG. 3 is a vector in which each element represents a weight for a node and the sum of all the elements is equal to 1. The value of the vector v changes in accordance with a desired object to obtain a trust value the processor calculates with consideration of the desired object. By increasing the value of the vector v corresponding to the node corresponding to the fashion magazine A, the trust value of each node the processor calculates is obtained in consideration of the trend of the fashion magazine A.

As another application, consider such individualization in which the degree of the trust relations among subjects are known in advance or are required to be enhanced and is reflected in the trust value calculation. A case where the trust value of an arrow is changed is now described. As described above, there are one or more arrows between nodes having some relation to each other. For example, the value associated with an arrow between a subject concerned with a specific magazine and another subject having a trust relation with the subject can be increased. The processor calculates trust value by considering the trust value of subscribers of the magazine concerned, by using the changed trust value associated with the arrows. As a result, the products of the subject which are considered to be credible can be recommended or introduced, and better products can be recommended or introduced to persons who subscribe to the magazine. In this case, the degree of credibility is introduced by changing the weights of the arrows among the nodes or changing the adjusted weight Pij. The calculation can be performed by using the trust relations associated with individuals or groups to which the individuals belong. Furthermore, trust values differ for different individual taste profiles such as age, sex, annual income, family structure, hobby, taste, etc. The processor can calculate trust values by changing the vector v shown in step 160 of FIG. 3 and the trust values of the arrows.

The invention is applicable to various fields: however, it is particularly effective in the following fields.

(1) Promotion of Sales Advancing Activities

If it is known that a particular manufacturer is trusted more than others, the products made by the manufacturer are introduced/recommended. Accordingly, sellers of the products of the manufacturers can effectively advance marketing and selling activities.

(2) Introduction/Recommendation of Products Matched With Requirements of Individuals (Personalization)

The products can be introduced/recommended on the basis of trust information of each subject based on general information and on different taste information of each individual.

(3) Introduction/Recommendation of Products Matched With Requirements of Specific Group For example, on the basis of information on subjects concerned with a specific magazine and trust relations among the subjects, the processor calculates trust values are calculated by considering the trust relations inherent to subscribers of the magazine, and better products can be recommended/introduced to persons subscribing to the magazine.

(4) Application to Information Filtering

The processor can perform a filtering function by selecting nodes having higher trust values on the basis of search results obtained by various searching systems. Furthermore, manufacturers and shops which have high trust values can be preferentially introduced to customers who put a higher premium on the trust of products and the trust of shops than the prices of the products.

While there have been described and illustrated specific embodiments of the invention, it will be clear that variations on the details of the embodiment specifically illustrated and described may be made without specifically departing from the true spirit and scope of the invention as defined in the appended claims.

I claim:

1. A device for calculating trust values of n nodes ($u_i$, i=1 to n), said device comprising:
a processor configured to execute:
a first unit for relating nodes with one another with arrows when the respective nodes have corresponding relations with one another;
a second unit for obtaining $P_{ij}$ (i, j=1 to n) as a weight for an arrow directed from a node $u_i$ to a node $u_j$ on the basis of the corresponding relation between nodes $u_i$ and $u_j$;
a third unit for determining $P'=cP+(1-c)E$, where c is a constant, E is a matrix in
which each element is greater than 0 and the sum of each row is 1, P is a matrix in
which an element of row i and column j is represented by $P_{ij}$; and
a fourth unit for calculating a trust value $TV(u_i)$ (i=1 to n) of each node $u_i$ as an eigen vector for an eigen value 1 of $P'^T$ based on the following equation:

$$TV(u_i) = \sum_{u_j \in BN(u_i)} P'_{ij} TV(u_j)$$

where,
$u_j \in BN(u_i)$ represents a set of all nodes from which arrows directed at node $u_i$ start; and
an output device for outputting information about a node or nodes with high trust values to a user to assist the user in identifying the trustworthy node or nodes among all said n nodes.

2. The device according to claim 1, wherein
the first unit is arranged for relating nodes $u_i$ and $u_j$ with zero or more arrows on the basis of the corresponding relationship between nodes $u_i$ and $u_j$; and
for each pair of nodes $u_i$ and $u_j$, the second unit is arranged for
assigning initial weight values to the arrows;
calculating a first sum of the initial weight values of all the arrows directed from node $u_i$ to node $u_j$;
calculating a second sum of the initial weight values of all the arrows having node $u_i$ as a starting point; and
dividing the first sum by the second sum to obtain $P_{ij}$.

3. The device according to claim 2, wherein the third unit is arranged for:
defining a vector v in which elements represent degrees of trust for the respective nodes and the sum of all elements is equal to 1, and
calculating said matrix $E=e \cdot v^T$, and $P'=cP+(1-c)E$, where c is a constant in $0 \leq c \leq 1$ and e is a vector in which all elements are equal to 1.

4. The device according to claim 1, wherein the third unit is arranged for:
defining a vector v in which elements represent degrees of trust for the respective nodes and the sum of all elements is equal to 1, and
calculating said matrix $E=e \cdot v^T$, and $P'=cP+(1-c)E$, where c is a constant satisfying $0 \leq c \leq 1$ and e is a vector in which all elements are equal to 1.

5. A computer-readable storage medium or storage device storing therein a program for causing, when executed by a processing arrangement, the processing arrangement to calculate trust values of n nodes ($u_i$, i=1 to n) by executing a process comprising:
relating nodes with one another with arrows when the respective nodes have corresponding relations with one another;
obtaining $P_{ij}$ (i, j=1 to n) as a weight for an arrow directed from a node $u_i$ to a node $u_j$ on the basis of the corresponding relation between nodes $u_i$ and $u_j$;
determining $P'=cP+(1-c)E$, where c is a constant, E is a matrix in which each element is greater than 0 and the sum of each row is 1, P is a matrix in which an element of row i and column j is represented by $P_{ij}$;
calculating a trust value $TV(u_i)$ (i=1 to n) of each node $u_i$ as an eigen vector for an eigen value 1 of $p'^T$ based on the following equation:

$$TV(u_i) = \sum_{u_j \in BN(u_i)} P'_{ji} TV(u_j)$$

where,
$u_j \in BN(u_i)$
represents a set of all nodes from which arrows directed at node $u_i$ start; and
outputting, via an output device, information about a node or nodes with high trust values to a user to assist the user in identifying the trustworthy node or nodes among all said n nodes.

6. The medium or device according to claim 5, wherein:
said relating comprises relating nodes $u_i$ and $u_j$ with zero or more arrows on the basis of the corresponding relationship between nodes $u_i$ and $u_j$; and
said obtaining comprises, for each pair of nodes $u_i$ and $u_j$, assigning initial weight values to the arrows;
calculating a first sum of the initial weight values of all the arrows directed from node $u_i$ to node $u_j$;
calculating a second sum of the initial weight values of all the arrows having node $u_i$ as a starting point; and
dividing the first sum by the second sum to obtain $P_{ij}$.

7. The medium or device according to claim 6, wherein said determining comprises:
defining a vector v in which elements represent degrees of trust for the respective nodes and the sum of all elements is equal to 1, and
calculating said matrix $E=e \cdot v^T$, and
$P'=cP+(1-c)E$, where c is a constant satisfying $0 \leq c \leq 1$ and e is a vector in which all elements are equal to 1.

8. The medium or device according to claim 5, wherein said determining comprises:
defining a vector v in which elements represent degrees of trust for the respective nodes and the sum of all elements is equal to 1, and
calculating said matrix $E=e \cdot v^T$, and
$P'=cP+(1-c)E$, where c is a constant satisfying $0 \leq c \leq 1$ and e is a vector in which all elements are equal to 1.

9. A method of calculating trust values of n nodes ($u_i$, i=1 to n), said method comprising:
relating nodes with one another with arrows when the respective nodes have corresponding relations with one another;
obtaining $P_{ij}$ (i, j=1 to n) as a weight for an arrow directed from a node $u_i$ to a node $u_j$ on the basis of the corresponding relation between nodes $u_i$ and $u_j$;
determining $P'=cP+(1-c)E$, where c is a constant, E is a matrix in which each element is greater than 0 and the sum of each row is 1, P is a matrix in which an element of row i and column j is represented by $P_{ij}$; and calculating, by a processor, a trust value $TV(u_i)$ (i=1 to n) of each node $u_i$ as an eigen vector for an eigen value 1 of $P'^T$ based on the following equation:

$$TV(u_i) = \sum_{u_j \in BN(u_i)} P'_{ij} TV(u_j)$$

where, $u_j \in BN(u_i)$ represents a set of all nodes from which arrows directed at node $u_i$ start; and outputting, via an output device, information about a node or nodes with high trust values to a user to assist the user in identifying the trustworthy node or nodes among all said n nodes.

10. The method according to claims 9, wherein:

said relating comprises relating nodes $u_i$ and $u_j$ with zero or more arrows on the basis of the corresponding relationship between nodes $u_i$ and $u_j$; and said obtaining comprises, for each pair of nodes $u_i$ and $u_j$, assigning initial weight values to the arrows;

calculating a first sum of the initial weight values of all the arrows directed from node $u_i$ to node $u_j$;

calculating a second sum of the initial weight values of all the arrows having node $u_i$ as a starting point; and dividing the first sum by the second sum to obtain $P_{ij}$.

11. The method according to claim 10, wherein said determining comprises:

defining a vector v in which elements represent degrees of trust for the respective nodes and the sum of all elements is equal to 1, and calculating said matrix $E=e \cdot v^T$, and $P'=cP+(1-c)E$, where c is a constant satisfying $0 \leq c \leq 1$ and e is a vector in which all elements are equal to 1.

12. The method according to claim 9, wherein said determining comprises:

defining a vector v in which elements represent degrees of trust for the respective nodes and the sum of all elements is equal to 1, and calculating said matrix $E=e \cdot v^T$, and $P'=cP+(1-c)E$, where c is a constant satisfying $0 \leq c \leq 1$ and e is a vector in which all elements are equal to 1.

* * * * *